3 Sheets—Sheet 1.
G. H. SPAULDING.
HARVESTER.
No. 185,873. Patented Jan. 2, 1877.
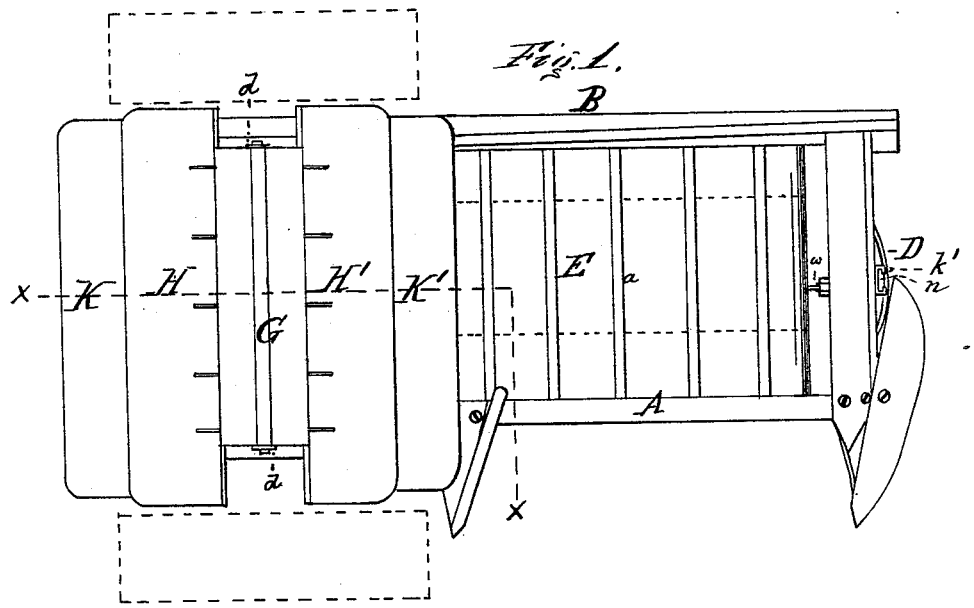
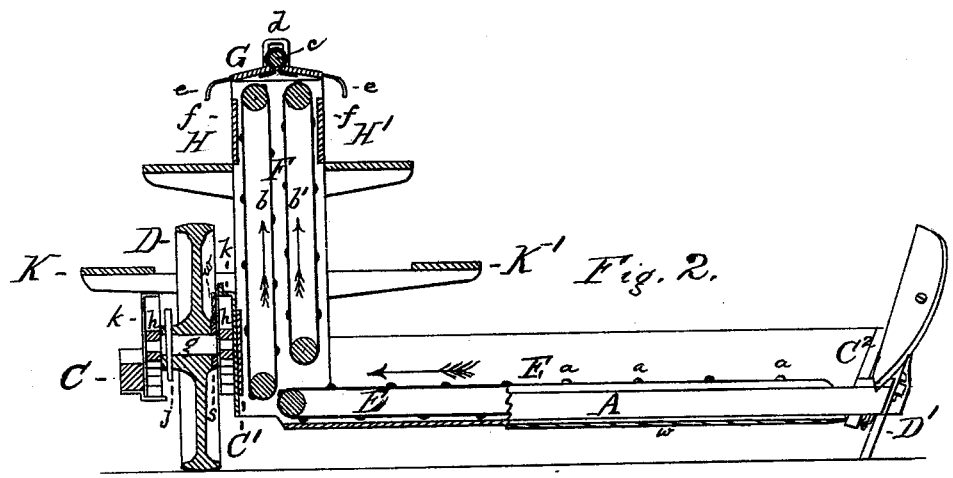
Witnesses.
W. L. Bennem,
W. H. Isaacs.
Inventor
George Henry Spaulding
by his atty
E. S. Renwick 3 Sheets—Sheet 2.
G. H. SPAULDING.
HARVESTER.
No. 185,873.  Patented Jan. 2, 1877.
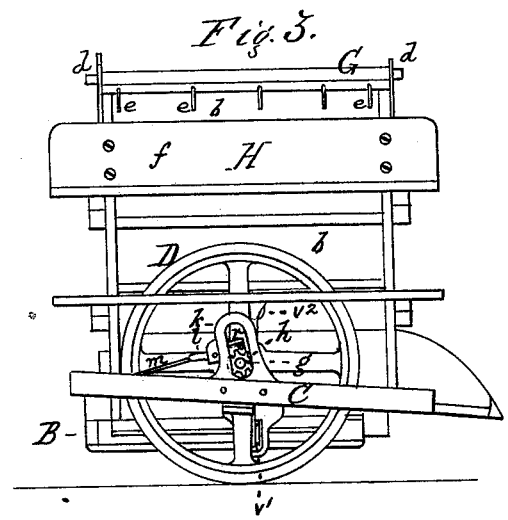
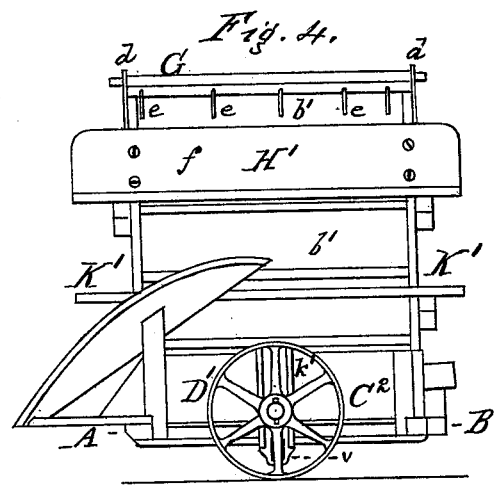
Witnesses
W. L. Bennem
W. H. Isaacs.
Inventor
George Henry Spaulding
by his atty
E. S. Renwicks.
N. PETERS, PHOTO-LITHOGRAPHER, WASHINGTON, D.C.

3 Sheets—Sheet 3.
G. H. SPAULDING.
HARVESTER.
No. 185,873. Patented Jan. 2, 1877.
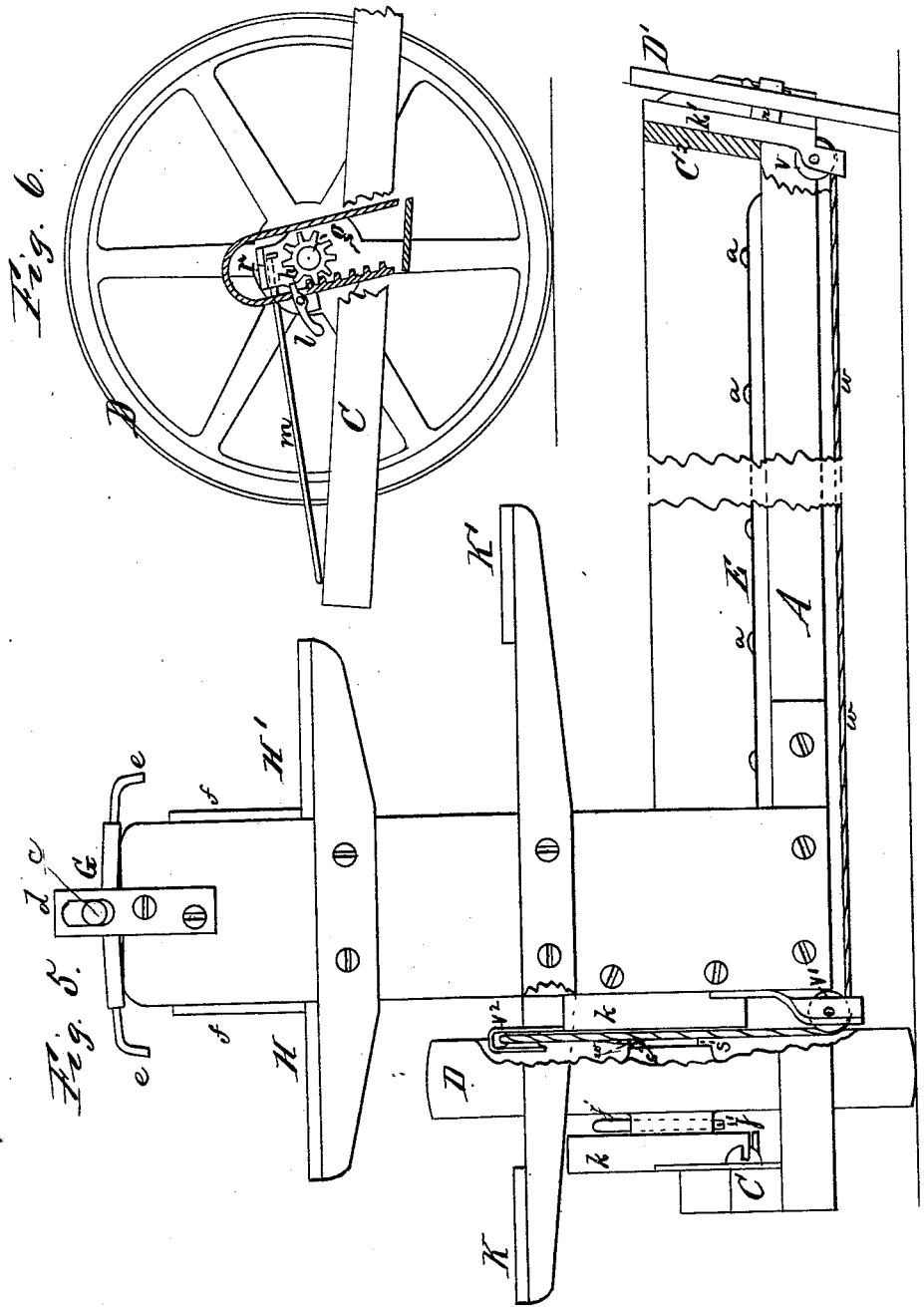
Witnesses
W. L. Bennerd.
W. H. Isaacs.
Inventor
George Henry Spaulding
by his attorney,
E. S. Renwick.

UNITED STATES PATENT OFFICE.

GEORGE HENRY SPAULDING, OF ROCKFORD, ILLINOIS, ASSIGNOR OF ONE-HALF HIS RIGHT TO WM. A. KNOWLTON, OF SAME PLACE.

IMPROVEMENT IN HARVESTERS.

Specification forming part of Letters Patent No. 185,873, dated January 2, 1877; application filed May 13, 1876.

*To all whom it may concern:*

Be it known that I, GEORGE HENRY SPAULDING, of Rockford, in the county of Winnebago and State of Illinois, have invented certain new and useful Improvements in Binder-Harvesters; and that the following is a full, clear, and exact description and specification of the same.

The object of these improvements is to deliver the grain to be bound upon elevated tables or receivers in suitable position to be bound or removed for binding by binders carried upon the machine, and at the same time to divide the mass of grain into two approximately-equal portions, the one delivered at one side of the elevator, and the other at the opposite side thereof; also, to enable the binders to work with facility; also, to facilitate the raising and lowering of the harvester to adjust the machine to cutting the stalks of grain of the proper length for binding.

To these ends my invention consists of certain combinations of instrumentalities, of which the following are the principal, viz: the main frame of the machine, which supports the various moving parts thereof; two running-wheels, for carrying the main frame, the one situated at or near the stubble end of the main frame, and the other at the grain side thereof; the collecting grain-conveyer, which receives the grain when cut, and by which it is collected by being carried toward the elevator, (this conveyer may be an endless belt, or any equivalent or substitute therefor—such as a raking mechanism—operating in connection with a fixed platform, or a series of belts armed with teeth;) the duplex elevator, composed of two belts, or their equivalents, which receive the grain from the grain-conveyer, grasp it between them, and raise it to the height required for binding; the gavel-divider, which acts upon the grain delivered at the upper end of the duplex elevator, and by whose action the elevated grain is directed in opposite directions laterally toward the grain-receivers; two grain-receivers for receiving the grain from the elevator and gavel-divider, and for holding it while it accumulates into a gavel, (one of these grain-receivers is arranged at the outer side of the elevator, and the other is at the inner side thereof;) two binders' supports, which may be foot-boards for the binders to stand upon.

The several combinations and arrangements of these instrumentalities which I claim as new are stated at the close of this specification. In order that they may be understood I have represented in the accompanying drawings, and will proceed to describe, the principal parts of a harvester embodying them in the best form thus far devised by me.

In the said drawings, Figure 1 represents a plan of the said parts of the harvester. Fig. 2 represents a partial front view, partial section of the same at the line $x\ x$ of Fig. 1. Fig. 3 represents an elevation of the stubble side of the machine. Fig. 4 represents an elevation of the grain side of the machine. Figs. 5 and 6 represent views of detached parts of the machine.

The main frame of the machine consists, in this example, of the finger-beam A, the back sill B, and the three cross-beams C $C^1$ $C^2$. The finger-beam sustains the usual cutting apparatus, composed of guard-fingers and reciprocating scalloped cutter, whose construction and operation are too well known to require a detailed description.

The main frame is supported upon two wheels, D D', one of which, D, is near the stubble-side of the machine, and constitutes the driving-wheel, it being connected by gearing with the various moving members of the machine, so that they derive their movement from it.

As the construction and operation of such gearing or transmitting mechanism are well understood by manufacturers of harvesters, it is not necessary to describe or represent them.

The grain cut by the cutting apparatus, and delivered by the usual grain-reel, is received upon the collecting-conveyer E, which is composed in this example of an endless belt, supported upon rollers, and fitted with cleats *a a*, which insure the movement of the grain with the face of the apron.

The apron carries the grain toward the stubble side of the machine, and delivers it to the elevator F. This elevator is of duplex construction, being composed of two endless belts, b b', whose adjacent surfaces are caused to move in the same upward direction, and with the same speed. One of them, b', is shorter than the other, so that the end of the conveyer E can pass beneath the shorter belt, and deliver the grain to the rising portion of the longer belt b. The two belts are, in this example, fitted with cleats, to insure the grasp of the grain by the elevating-surfaces. The cleats serve also to keep the canvas stretched to its full width.

The duplex elevator carries the grain upward to the gavel-divider G, which is composed of two thin boards or flaps, connected by canvas with a central longitudinal rail, c, Fig. 2. The ends of this rail project through slotted standards d d, one at each end of the elevator, so that the gavel-divider may rise and descend to accommodate its position to the greater or less quantity of grain projected against its under face by the elevator.

The edges of the gavel-divider are fitted with guide-prongs e e e, which are curved downward, so as to direct the grain to the grain-receivers H H' beneath. The construction of the gavel-divider may, however, be varied, as found expedient.

The grain-receivers H H' are arranged at opposite sides of the elevator, one receiver, H, being at the outer side of the elevator, and the other receiver at the inner side thereof. Each receiver is arranged sufficiently below the upper end of the elevator to hold the quantity of grain required to form a sheaf, which quantity accumulates by the progressive delivery of grain in a downward or outward direction from the elevator. Each receiver has a guard-board, f, which separates the grain upon it from the descending face of the adjacent elevating-belt, and each receives the grain discharged at one side of the elevator.

The binders' foot-boards K K' are arranged below the level of the grain-receivers, and at opposite sides of the elevator, so that the binders supported upon them are in convenient positions to bind the grain on the receivers, or to lift the grain therefrom and place it upon binding-tables separate from the receivers. In case such tables are used, one of them may be arranged in the rear of the elevator and the other in front of it, as represented in dotted lines in Fig. 1. In this case, when two binders work on the machine, both may bind upon either the front table, or upon the rear table, or one upon each. If more than two binders are required, this arrangement of tables will afford space for three or four binders.

In order that the grain may be of the proper length for binding, the machine is raised or lowered upon the driving-wheels, so as to regulate the distance from the cutting apparatus to the heads of the standing grain.

In order that the machine may be raised by the power by which it is drawn forward, the main running-wheel D is constructed to turn upon an arbor, g, which may be fastened to it or may be loosed from it. In the former case, the arbor is compelled to turn with the driving-wheel; in the latter case the wheel runs loose upon the arbor without imparting motion to it. The fastening of the arbor to the wheel is effected, in this example, by connecting the former with the hub of the wheel by a pin, j, and the loosing by the withdrawal of the pin; but a clutch or other device operated by a lever may be used for the purpose. Each end of the arbor is fitted with a pinion, h, which is received in a guide-standard, k, which is curved to a segment of a circle whose center is the axis of the first pinion-shaft, to which motion is transmitted from the driving-wheel. The rear inner side of each of these standards is fitted with a rack of fixed cog-teeth corresponding in pitch and size with those of the arbor-pinion h. These rack-teeth extend nearly to the upper end of each standard. When the pinions are fastened to the wheel-arbor by means of the pin, the turning of the driving-wheel, by the drawing of the machine forward, causes the pinions to engage successively with the teeth of the racks, and to raise the racks and their standards, thereby raising the stubble side of the machine bodily. The pinions and rack standards constitute the mechanism for raising the frame by the draft of the machine applied through the pole and the driving-wheel as a rotating lever.

The stubble side of the machine is secured in its raised position by means of a locking device, which, in this example, is composed of two latches, r, each of which is constructed to vibrate upon the arbor g, and each of which has a head, which is constructed to engage between two of the rack-teeth, and thus hold the arbor and racks in their relative positions when the pin j is withdrawn to disconnect the driving-wheel from its arbor.

In order that the two latches of the locking-device may both be disengaged simultaneously, for the purpose of permitting the frame to be lowered by backing the machine, they are connected by a bent rod, m. The two movable rack-teeth may be connected in like manner, so that they may be operated simultaneously.

In order that the grain side of the machine may be raised and lowered simultaneously with the stubble side thereof, the arm or arbor of the grain-wheel D' is fitted to a slide, n, which is fitted to slide up and down in the standard k', and this slide is connected with a loop, s, upon the arbor of the stubble or driving wheel D by means of a rope or chain, w, which, proceeding from the slide n of the grain-wheel, passes down partially round a sheave, v, at the lower end of the standard k', thence horizontally beneath the machine to and partly around a corresponding sheave, $v^1$, at the lower end of one of the standards k of the stubble-wheel; thence upward to and partly around a sheave, $v^2$, at the upper end of the same standard; and thence down to the loop *s* upon the wheel-arbor. The rope or chain thus forms a connection between the arms or arbors of the two running-wheels, and when the stubble end of the machine is raised by the action of the pinions and rack-standards the grain end is correspondingly pulled upward on the slide of the grain-wheel D' by the action of this connection *w*.

When the machine is to be lowered the pinions *h* are fastened to the arbor by the insertion of the pin *j*. A slight movement of the machine forward permits the locking device to be disengaged, after which the backing of the team lowers the machine by permitting the racks to move down as the pinions turn backward. In order to prevent breakage by the accidental too far backing of the team, the upper tooth of each rack is made movable by forming it at the inner end of a lever which is pivoted in a slot in the rack. The outer end of this lever is made heavy enough to overbalance the weight of the tooth, and thus hold the latter in its position for engaging with the pinion; but if the pinion be turned backward when it is in the bearing in the upper part of the standard the strain upon the movable tooth exceeds the overbalancing by the tooth-lever; hence the tooth yields in a downward direction to movement by the pinion, and is not broken.

From the above description and the drawings it will be perceived that the grain is elevated by acting equally upon its opposite sides by the two belts running with equal speed, and, as the belts turn outward at their upper ends, there is a tendency to carry outward the raised stalks which are directly in contact with each belt. The tendency is enhanced by the operation of the gavel-divider G, which, floating upon the grain at the upper end of the elevator, holds it in contact with the outturning parts of the two belts, and thus insures the division of the elevated grain into two approximately equal parts, each of which is directed downward by the prongs at the edges of the gavel-divider, to the receivers beneath. These receivers, being both arranged at a lower level than the upper end of the elevator, receive the grain from above, instead of beneath, as has been heretofore attempted, and hold it for the binders.

In place of using broad belts for the elevator and collecting conveyer, narrow independent belts may be used, and each may be fitted with an appropriate series of projections or teeth to act upon the grain. If preferred, strips may be arranged between these teeth to hold the grain while the teeth move it. If preferred, also, other suitable raising mechanism than that above described may be interposed between the stubble-wheel and the main frame, to enable the latter to be raised by the turning of the former, and some other suitable locking device may be used to secure the frame when raised. The raising mechanism also may be combined directly with the grain-wheel, instead of with the stubble-wheel.

I claim as my invention—

1. The combination, substantially as before set forth, of the duplex elevator and two grain-receivers, arranged at opposite sides of the elevator, and sufficiently below the level of its upper end to receive the grain in a downward direction from the opposite sides of the elevator, and to hold a gavel of grain upon each.

2. The combination, substantially as before set forth, of the duplex elevator and the gavel-divider, arranged at the upper end thereof.

3. The combination, substantially as before set forth, of the duplex elevator, the gavel-divider, and two grain-receivers, arranged at opposite sides of the elevator, and below the level of its upper end.

4. The combination, substantially as before set forth, of the duplex elevator, the gavel-divider, the grain-receivers, arranged at opposite sides of the elevator below its upper end, and the binder-supports arranged at opposite sides of the elevator and below the level of the grain-receivers.

5. The combination, substantially as before set forth, of the main frame, the stubble-wheel, the mechanism for raising the main frame by the turning of the stubble-wheel, the grain-wheel, and the connection between the arbors of the said two wheels, whereby both sides of the machine are raised simultaneously by the turning of the stubble-wheel.

Witness my hand this 18th day of April, A. D. 1876.

GEORGE HENRY SPAULDING.

Witnesses:
 BYRON GRAHAM,
 D. B. ALEXANDER.